(12) United States Patent
Hollander

(10) Patent No.: US 6,719,125 B1
(45) Date of Patent: Apr. 13, 2004

(54) CONVEYING AND/OR STORAGE DEVICE FOR PACKAGED GOODS

(75) Inventor: Rudolf Hollander, Vorden (NL)

(73) Assignee: Dynamic Systems Engineering B.V., Doetinchem (NL)

( * ) Notice: Subject to any disclaimer, the term of this patent is extended or adjusted under 35 U.S.C. 154(b) by 0 days.

(21) Appl. No.: 10/019,371

(22) PCT Filed: Jun. 11, 2000

(86) PCT No.: PCT/EP00/10927

§ 371 (c)(1),
(2), (4) Date: Dec. 19, 2001

(87) PCT Pub. No.: WO01/83336

PCT Pub. Date: Nov. 8, 2001

(30) Foreign Application Priority Data

Apr. 27, 2000 (DE) .................................. 100 20 608

(51) Int. Cl.⁷ .............................................. B65G 13/06
(52) U.S. Cl. ........................... 198/781.03; 198/781.02; 198/790; 198/782
(58) Field of Search ................ 198/781.03, 781.02, 198/790, 782, 461.2, 461.1, 459.6, 463.4

(56) References Cited

U.S. PATENT DOCUMENTS

| | | |
|---|---|---|
| 3,458,026 A | 7/1969 | Lauzon et al. |
| 3,567,010 A | 3/1971 | vom Stein |
| 3,756,376 A | 9/1973 | Krüger et al. |
| 3,840,109 A | 10/1974 | Kohl |
| 3,933,237 A | 1/1976 | Rottermann |
| 4,006,815 A | 2/1977 | Werntz |
| 4,266,659 A | 5/1981 | Mayer et al. |
| 4,325,474 A | 4/1982 | Rae |
| 4,345,684 A * | 8/1982 | Rolland ................ 198/781 |
| 4,421,224 A | 12/1983 | Dingman |
| 4,527,937 A | 7/1985 | Tomasello |

(List continued on next page.)

FOREIGN PATENT DOCUMENTS

| | | | |
|---|---|---|---|
| CH | 432 366 | 9/1967 | |
| DE | 756 902 | 12/1944 | |
| DE | 1 904 486 | 11/1964 | |
| DE | 1 925 556 | 4/1971 | |
| DE | 2 227 645 | 12/1973 | |
| DE | 27 42 579 | 3/1979 | |
| DE | 27 02 724 | 11/1983 | |
| DE | 32 15 744 | 11/1983 | |
| DE | 35 04 365 | 10/1986 | |
| DE | 44 19 416 | 12/1995 | |
| DE | 295 19 805 | 3/1996 | |
| DE | 298 17 239 | 11/1998 | |
| DE | 298 07 325 | 9/1999 | |
| EP | 2 264 254 | 3/1991 | |
| EP | 0 505 206 A2 * | 3/1992 | ................. 198/781 |
| EP | 0 803 453 | 10/1997 | |
| GB | 1 547 671 | 6/1979 | |

OTHER PUBLICATIONS

Gebindelager nach Mass; Produktion und Handling; No. 12/1994.

Wir lassen Material und Daten parallel fliessen. Für perfekten Förderfluss. Transform System; Logistik im Unternehmen; No. 51991.

Primary Examiner—Douglas Hess

(57) ABSTRACT

A transport and storage device for packaged goods has at least one roller path for goods to be transported and stored, wherein the at least one roller path has rollers. Force transmitting elements are arranged rotatably on the rollers, wherein the force transmitting elements are bushings having an inner surface, respectively. A common drive is provided for rotating the rollers, wherein a first torque transmittable between the bushings and the corresponding rollers, respectively, is smaller than a second torque transmittable between the common drive and the bushings. The rollers have a bearing section fixedly connected with the rollers, respectively. The inner surfaces of the bushings are rotatably supported on the bearing section of the rollers.

14 Claims, 11 Drawing Sheets

U.S. PATENT DOCUMENTS

| | | | | |
|---|---|---|---|---|
| 4,788,574 A | * | 11/1988 | Matsumoto et al. | 355/4 |
| 4,835,702 A | | 5/1989 | Tanaka | |
| 4,915,566 A | | 4/1990 | van Elten | |
| 5,040,669 A | * | 8/1991 | Blocker | 198/782 |
| 5,316,129 A | * | 5/1994 | Daily | 198/780 |
| 5,316,130 A | * | 5/1994 | Heit et al. | 198/781 |
| 5,649,891 A | * | 7/1997 | Kass et al. | 492/47 |
| 6,003,661 A | * | 12/1999 | Beck | 198/790 |
| 6,341,698 B1 | * | 1/2002 | Wursthorn | 209/552 |
| 6,494,306 B1 | * | 12/2002 | Hollander | 198/349.5 |

* cited by examiner

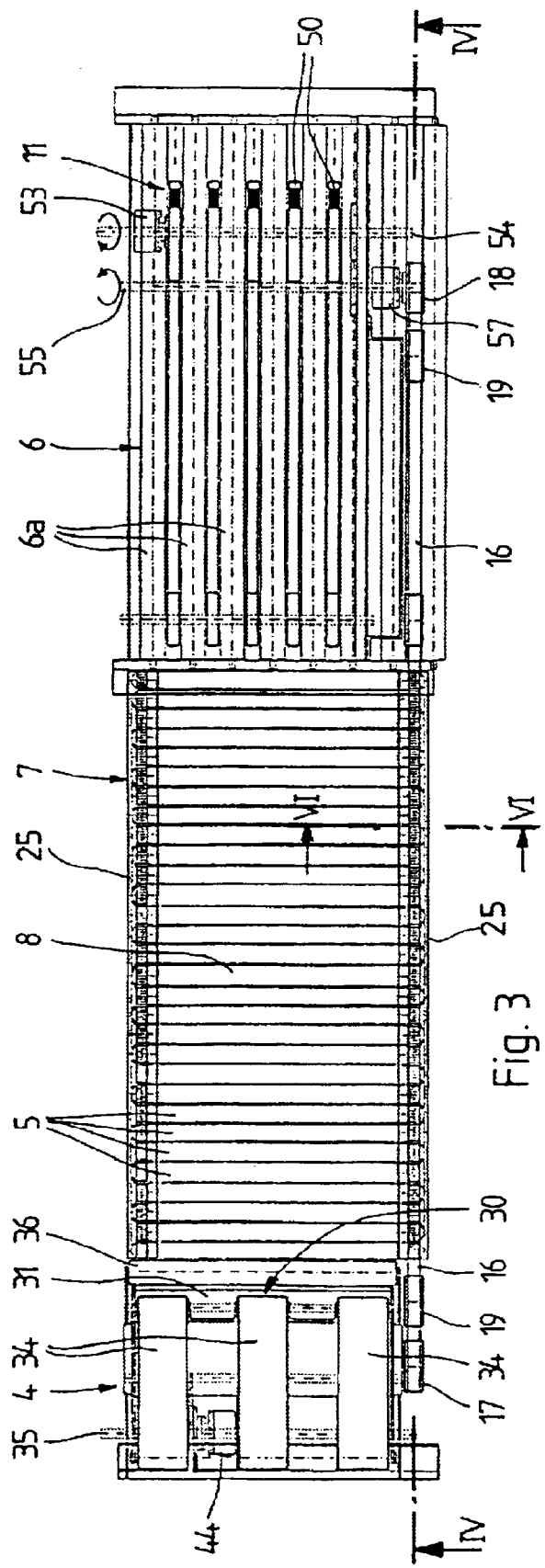
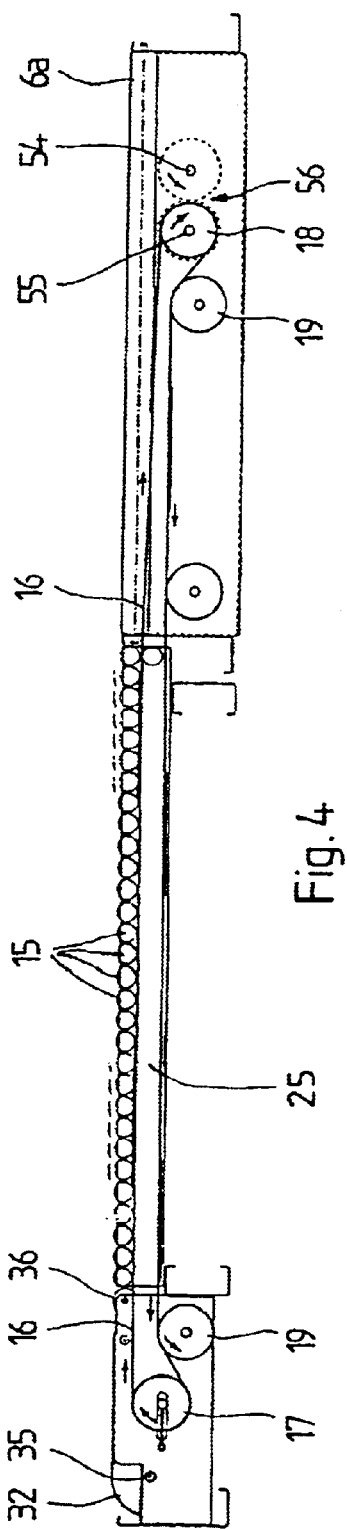
Fig. 3
Fig. 4

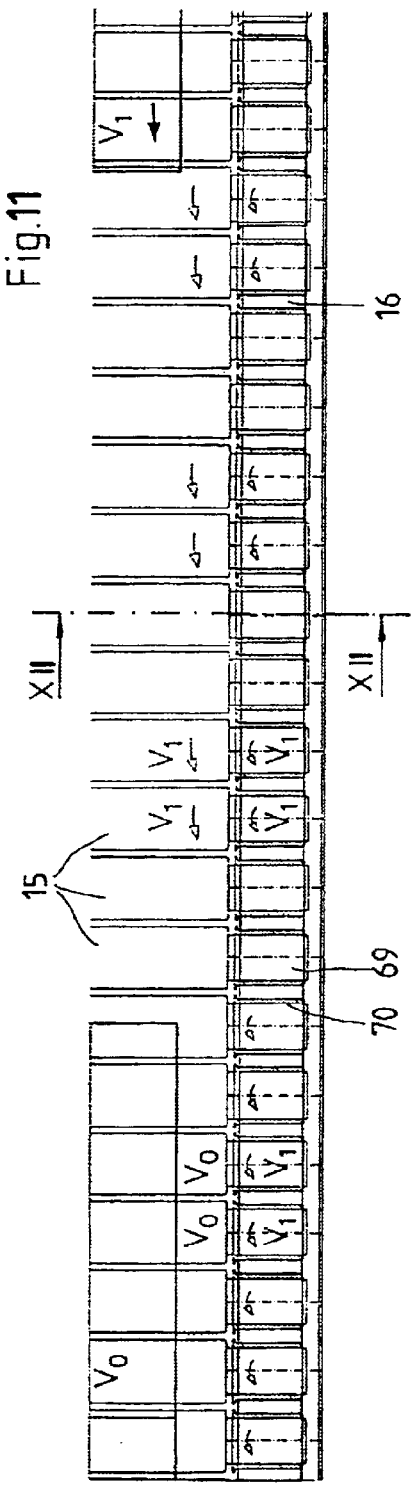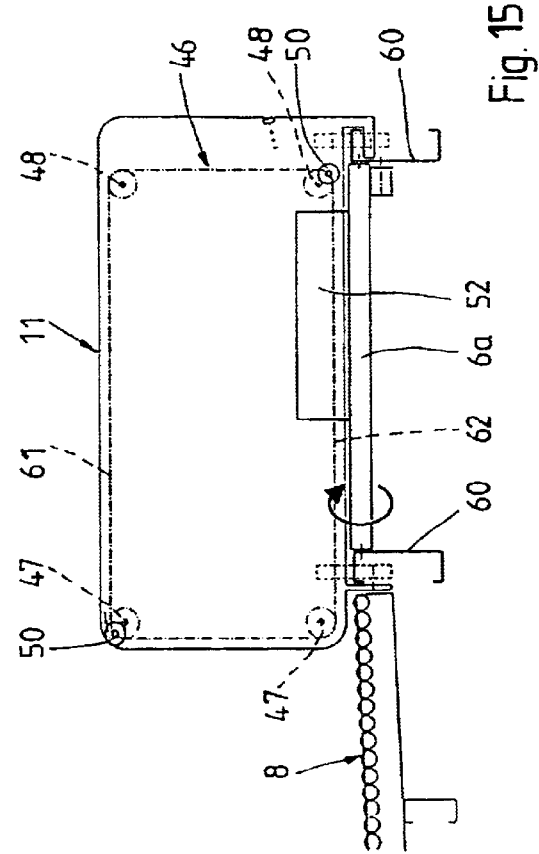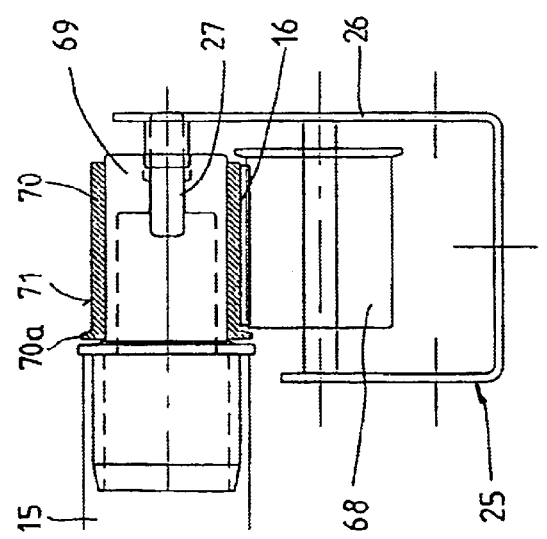

CONVEYING AND/OR STORAGE DEVICE FOR PACKAGED GOODS

BACKGROUND OF THE INVENTION

1. Field of the Invention

The invention relates to a transport and/or storage device for packaged goods, comprising at least one aisle formed as a roller path for the goods to be transported and/or stored.

2. Brief Description of the Related Art

In the storage and commission technology shelf constructions of several levels are known with adjacently positioned and stacked storage aisles for the packaged goods. The shelves of the storage aisles are provided with roller paths of rotating rollers for transporting the packaged goods and, generally, are slanted slightly toward the removal side so that the goods supplied at the one end of the storage aisles, the so-called loading or supply side, will move along the roller paths to the other end of the storage aisles where the receiving area is arranged. The supply of the packaged goods at the loading side can be performed manually in that the individual packaged goods are removed from a pallet and placed into the correlated storage aisle. Often, the removal or commissioning in the removal area of the shelf can also be performed by hand.

Inasmuch as the roller paths are slanted, it is problematic to configure them uniformly optimized for all types of packaged goods. Heavy packaged goods are transported more effectively under the effect of the force of gravity and at higher speeds along the roller paths than light-weight goods. When the slant angle of the roller paths is too small, this can result in the light-weight goods not to be transported at all. However, when the slant angle is increased, this leads to an improved transport of the lightweight goods but, at the same time, the transport speed of heavy goods is increased more than proportionally. The latter move with increasing speed along the roller path until they impact on a stop provided at the removal side with significant mechanical loading. In the case of several package goods arranged successively in the aisle, considerable impact pressure can result which is also caused only by the effect of the force of gravity.

SUMMARY OF THE INVENTION

It is an object of the invention to provide a transport and/or storage device for packaged goods with which a uniform transport speed of the packaged goods can be obtained, wherein a too high impact pressure as a result of packaged goods backing up on possible obstacles can be prevented.

As a solution to this object it is suggested in regard to a transport and/or storage device of the aforementioned kind that the rollers or rolls of the roller path are provided with force transmitting elements arranged rotatably on the rollers or rolls which can be rotated by a common drive means and in that the transmittable torque between the force transmitting element and the respective roller or roll is smaller than the torque transmittable between the common drive means and the force transmitting element.

The device according to the invention is characterized in that the individual packaged goods, inasmuch as they are backed up on an obstacle, are subjected only to a minimal impact pressure. Also, in this case an increased loading of the drive of the roller path is avoided. Moreover, an especially smooth and uniform drive of the packaged goods transported on the roller path can be achieved. Even packaged goods, such as, for example, filled boxes of beverages of plastic material which are especially critical in the conventional storage and transport technology, can be processed trouble-free and with low wear on the transporting devices by means of the roller path according to the invention. The roller path can extend either horizontally, wherein the transport of the packaged goods is effected exclusively by the drive of the rollers or rolls, or the roller path can be slightly slanted. In the latter case, two transport mechanisms are used simultaneously. The first transport mechanism is the drive of the rollers or rolls of the roller path by means of a common drive means. The second drive mechanism is the effect of the force of gravity as result of the descending roller path. This double movement mechanism results in an excellent uniformness in the transport speed of the packaged goods independent of their weight and size. Even packaged goods with high specific weight such as, for example, beverage boxes are transported as quickly and with almost constant transport speed along the roller path such as particularly lightweight packages, for example, cardboard packages with potato chips or packages with toilet paper. In regard to a slanted arrangement of the roller path, a slant angle of the roller path of 2.5 to 6%, preferably 3 to 5.5%, has proven to be especially suitable for obtaining such a uniform transport.

A preferred configuration of the transport and/or storage device is characterized by a storage area with a plurality of storage aisles for the goods to be stored which extend parallel to one another and are comprised of roller paths.

A common drive means is preferably provided in the form of an endless drive belt. This drive belt, for obtaining a minimal drive slip while providing at the same time an inexpensive configuration of the roller path, can be guided between the force transmitting element and an abutment, respectively. The abutment is preferably in the form of counterpressure rollers.

According to a preferred configuration, the force transmitting element is a bushing supported rotatably on a bearing portion of the roller or roll. A targeted, even though only minimal, friction between the freely rotating bushing and the roller or roll is obtained. This causes a very "smooth" drive of the roll with only minimal drive or torque moments while upon increase of this drive moment the friction surfaces between bushing and roller or roll will slip so that no significant torque is transmitted from the bushing onto the roll. The coefficient of friction between roller or roll and the bushing is smaller than the transmittable torque between the common drive means and the bushing. The thus obtained "smooth" drive of the rolls results in a reduction of the conveying pressure of the roller path so that only minimal pressure is exerted primarily onto the piece of packaged goods arranged in the leading position at the removal end of the storage aisle. It is furthermore advantageous that also the removal devices, as a result of the reduced impact pressure of the goods, can be operated with reduced drive power.

Preferably, the bearing section on which the bushing is rotatably supported is a pin formed at one end of the roller/roll which has a smaller diameter than the roller/roll itself. In this case, roller or roll and pin can be manufactured as a monolithic part, preferably, of plastic material.

For obtaining a uniform drive action, it is also moreover advantageous when the bushing is provided at its end facing the roller or roll with a circumferential collar. The drive belt can run up against this collar without laterally slipping off the drive surface of the bushing.

For obtaining a sufficient constructive freedom in designing the drive and deflection devices for the drive means of the roller path, it is moreover suggested that the deflection of the drive belt is realized by at least two deflection rollers, wherein one deflection roller is arranged below the removal area of the storage aisle and is driven.

Each storage aisle can be provided with a removal device, and the components of the removal devices can be in the form of a retaining element projecting into the transport path of the roller path and a horizontal conveyor arranged in the conveying direction behind the retaining element whose transport speed is greater than the transport speed of the roller path. Preferably, the conveying speed of the horizontal conveyor is at least 25% greater than the transport speed of the roller path. In this way, a safe and trouble-free separation of the frontmost piece of packaged goods to be removed is achieved from the packaged goods positioned therebehind and transported on the roller path.

In view of the goal of a compact configuration of the device, it is suggested that the horizontal conveyor is comprised of a driven first pulley, at least one further entrained pulley as well as an endless belt which is guided about the pulleys wherein the driven pulley defines the forward end and the entrained pulley the rearward end of the horizontal conveyor.

BRIEF DESCRIPTION OF THE DRAWINGS

In the following, devices according to the invention will be explained with the aid of embodiments with reference to the drawings. The FIGS. 1–6 as well as 10–12 show a first embodiment of a commissioning storage device, the FIGS. 7–15 a second embodiment of a commissioning storage device. In detail, the drawings show:

FIG. 3 a detail illustration corresponding approximately to that of FIG. 2 of a storage aisle with coordinated supply area as well as correlated removal device;

FIG. 4 a storage aisle in a section along the line IV—IV of FIG. 3;

FIG. 11 a plan view onto a side area of the storage aisle according to FIG. 10;

FIG. 12 a partial section along the line VI—VI of FIG. 3 and along the line XII—XII of FIG. 11;

FIG. 15 in a side view details of a transverse conveyor arranged in the supply area of the commissioning storage device.

DESCRIPTION OF PREFERRED EMBODIMENTS

Figure 1:
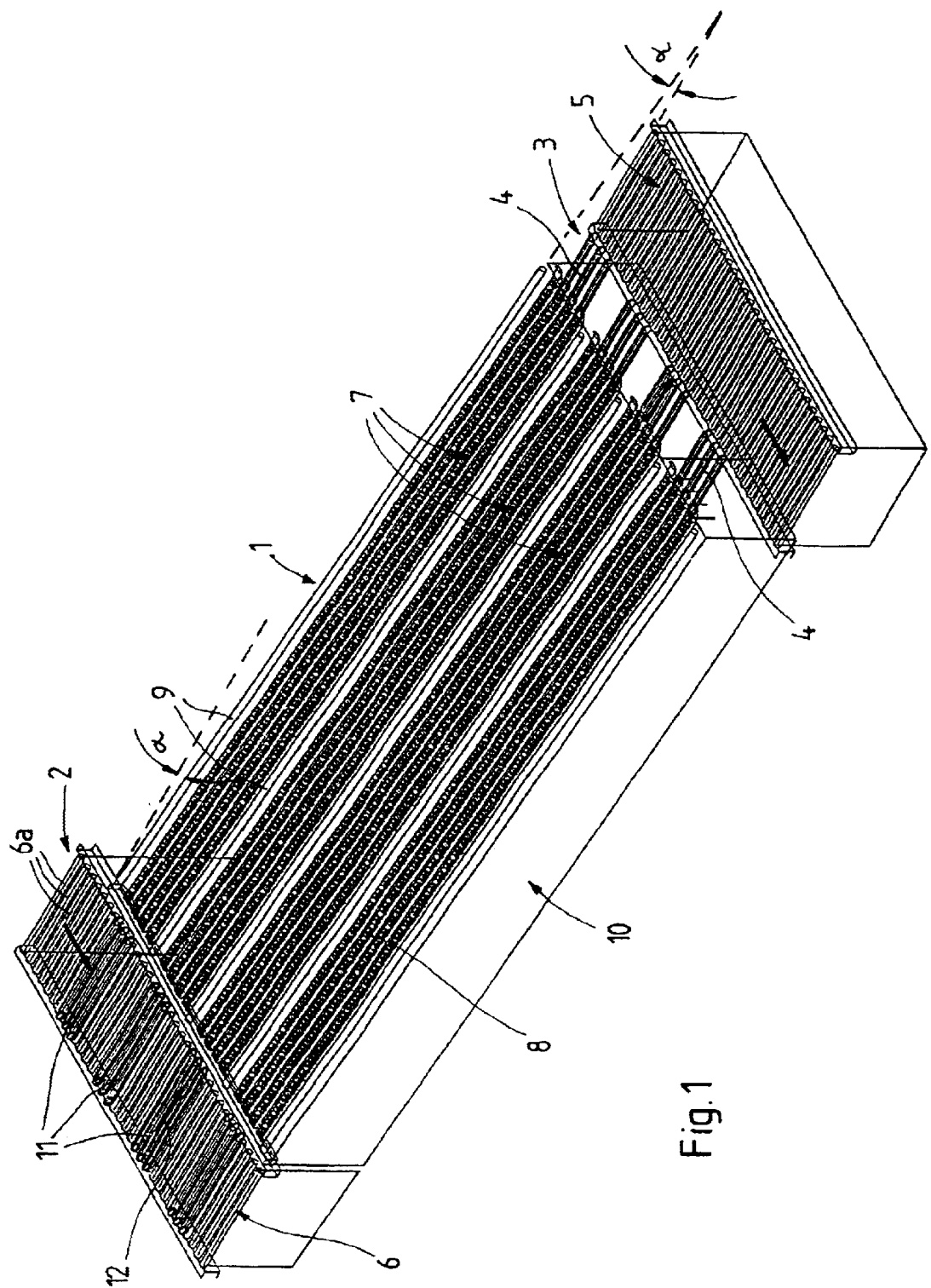
FIG. 1 in a perspective illustration a part of a commissioning storage device comprising a loading area, a storage area, and a commissioning area.

The commissioning storage device for packaged goods, including beverage boxes, and for groceries in cardboard boxes, which have a very high turnover rate in wholesale, is comprised primarily of a storage area 1, a supply area 2 arranged upstream of the storage area 1, and a commissioning area 3 downstream of the storage area 1. In the supply area 2 the packaged goods to be newly stored are distributed to the correct storage location within the storage area 1. In the commissioning area 3 the individual packaged goods are then removed according to the commission by computer control from the storage area 1 and transported to a location where the combination and optionally packaging of the commissions to larger packaged arrangements is realized. For removal of the individual goods from the storage area 1, removal devices 4 are provided which place the individual goods removed from the storage area 1 on a transport path 5 arranged downstream along which the further transport of the goods is carried out.

The supply of goods in the supply area 2 is also realized by means of a continuously driven transport path 6 which, like the transport path 5 of the commissioning area 3, is comprised of a plurality of driven transport rolls 6a on which the packaged goods to be transported are moved by rolling.

The storage area 1 is comprised of a plurality of parallel-arranged storage aisles 7. The storage aisles 7 can be slanted slightly in a downward direction toward the removal devices 4 and can be comprised of roller paths 8 of rollers or rolls which are supported with their two ends in profiles. The individual storage aisles 7 are separated from one another by borders 9 so that the goods during their transport on the storage aisles cannot move accidentally into the neighboring storage aisles. In the context of the configuration to be explained in the following in detail, the function of the borders 9, i.e., the lateral guiding of the goods, can also be realized by wheel flanges on the rollers or rolls.

Each storage aisle 7 contains only goods or packaged goods of the same kind. In the storage area 1, illustrated in FIG. 1 and comprised of a total of four storage aisles, it is thus possible to store four different types of goods. The goods of the same type are positioned successively in the respective storage aisle 7 wherein, as a result of a drive of the roller path to be described in more detail in the following, they move up to the end of the storage aisle 7 facing the commissioning area 3 and the leading piece of goods is secured by a retaining element. The transport of the goods along the roller paths 8 can be realized by the effect of the force of gravity in the case of a descending arrangement of the roller paths at an angle α illustrated in FIG. 1.

The total of four storage aisles 7 illustrated in FIG. 1 together form a module 10. Several such modules can be arranged adjacent to one another so that, as a function of the spatial conditions, up to 100 storage aisles can be arranged adjacent to one another and with common devices of supply area 2 and commissioning area 3. In addition, the illustrated commissioning storage device can also be arranged in several layers above each other in order to obtain in this way a multiplication of the space utilization.

The transport path 6 is common to all storage aisles 7 so that via the transport path 6 goods of different types can be transported. In order to sort the goods into the correct storage aisle 7, each storage aisle has its own transverse conveyor 11 with conveying direction 12 in the direction toward the storage aisle arranged upstream thereof. The control of the respective transverse conveyor 11 is realized fully automatically as a function of the group of goods supplied by the transport path 6. Their identification can be realized, for example, by means of a bar code which is located on the packaged goods.

The purely schematic illustration of FIG. 1 does not show a second commissioning area provided on the side of the transport path 6 facing away from the storage aisles 7 so that by means of the transport path 6 commissioning areas on both sides can be supplied. Of course, in this case the transverse conveyors 11 should also be capable of transporting in both directions.

In the commissioning area 3 the goods are removed individually by means of removing devices 4 from the storage aisles 7 and are transferred onto the common transport path 5 which extends transversely to the storage aisles. Each individual storage aisle 7 has correlated therewith its own removal device 4 so that goods can be removed at the same time from several storage aisles 7 and transferred onto the sufficiently wide transport path 5.

Details and the function of the roller paths 8 of the storage area will be explained in the following.

The rolls 15 can be rotated by means of a common drive means driving preferably all rollers of the roller path. This common drive means is an endless drive belt 16 which is guided about deflection rollers 17, 18. The deflection roller 17 is arranged under the commissioning area 3 and the deflection roller 18 under the supply area 2 of the commissioning storage device. In addition, suitable tensioning rollers 19 are provided which generate the required tensioning pressure on the drive belt for a proper transport of the drive belt 16. This tension can be generated however also directly by means of the deflection rollers 17 or 18.

In order for the drive belt 16 to act securely on the rolls 15, the resulting reaction force must be received. For this purpose, an abutment is provided which has the configuration of a continuous surface across the entire length of the roller path 8. The upper run of the drive belt 16 is thus guided between the abutment and the individual rolls 15. The abutment can be a flat surface of a profile which is inserted into the roller path profile 25. An outer leg of the roller path profile 25 serves for supporting the individual rollers or rolls 15. The rollers or rolls 15 are provided in this connection with short axles which are connected by snap-on clips on the outer legs of the roller path profile 25. Such clips make it possible to exchange the individual rolls quickly and simply for other rolls. Upon return transport, the lower run of the drive belt 16 extends within the roller path profile 25.

With the aid of FIG. 5 the details and the function of the removal devices 4 will be explained in the following.

Each removal device 4 is comprised of a horizontal conveyor 30 and a retaining element 31. The horizontal conveyor 30, whose conveying plane is identical to the conveying plane of the roller path 8, is comprised of two pulleys 32, 33 about which a wide belt 34 is guided. Each horizontal conveyor 30 is comprised of a total of three of these belts 34. The pulley 32 which is farther away from the roller path 8 is driven and is seated for this purpose directly on the drive shaft 35. The drive shaft 35 is driven continuously and drives simultaneously the horizontal conveyors 30 of several storage aisles. All horizontal conveyors 30 therefore operate permanently. In contrast to the pulley 32, the other pulley 33 of the horizontal conveyor 30 is not driven. The pulley 33 is positioned as closely as possible next to the roller path 8. In the embodiment, between the pulley 33 and the adjacently positioned roll 15 of the roller path a smaller, freely rotating roll 36 is positioned and entrained.

A component of the retaining element 31 of the removal device 4 is moreover a lever 37 on whose end the locking member of the retaining element is positioned. The lever 37 is supported on a horizontal axle 38. The retaining element 31 can be pivoted back and forth between two positions on the axle 38. In the first position, which is positioned at the top in FIG. 5, the locking member of the retaining element 31 projects into the conveying path for the goods 39. In its other position, the retaining element 31 is lowered into the conveying plane or a position underneath it. This position of the retaining element 31 is shown in the second and third illustrated process stages of FIG. 5.

In order to transfer the retaining element 31 from its locking position into its release position, a cam 40 is provided which is supported on an axle which is coaxial to the drive shaft 35. The cam 40 has a cam surface 41 which runs on a roll 42, wherein the roll 42 is positioned on a lever 37. In the embodiment the lever 37 is a two-arm lever wherein at the end of one arm the locking member is positioned while on the length of the other arm the roller 42 is supported.

Figure 5:
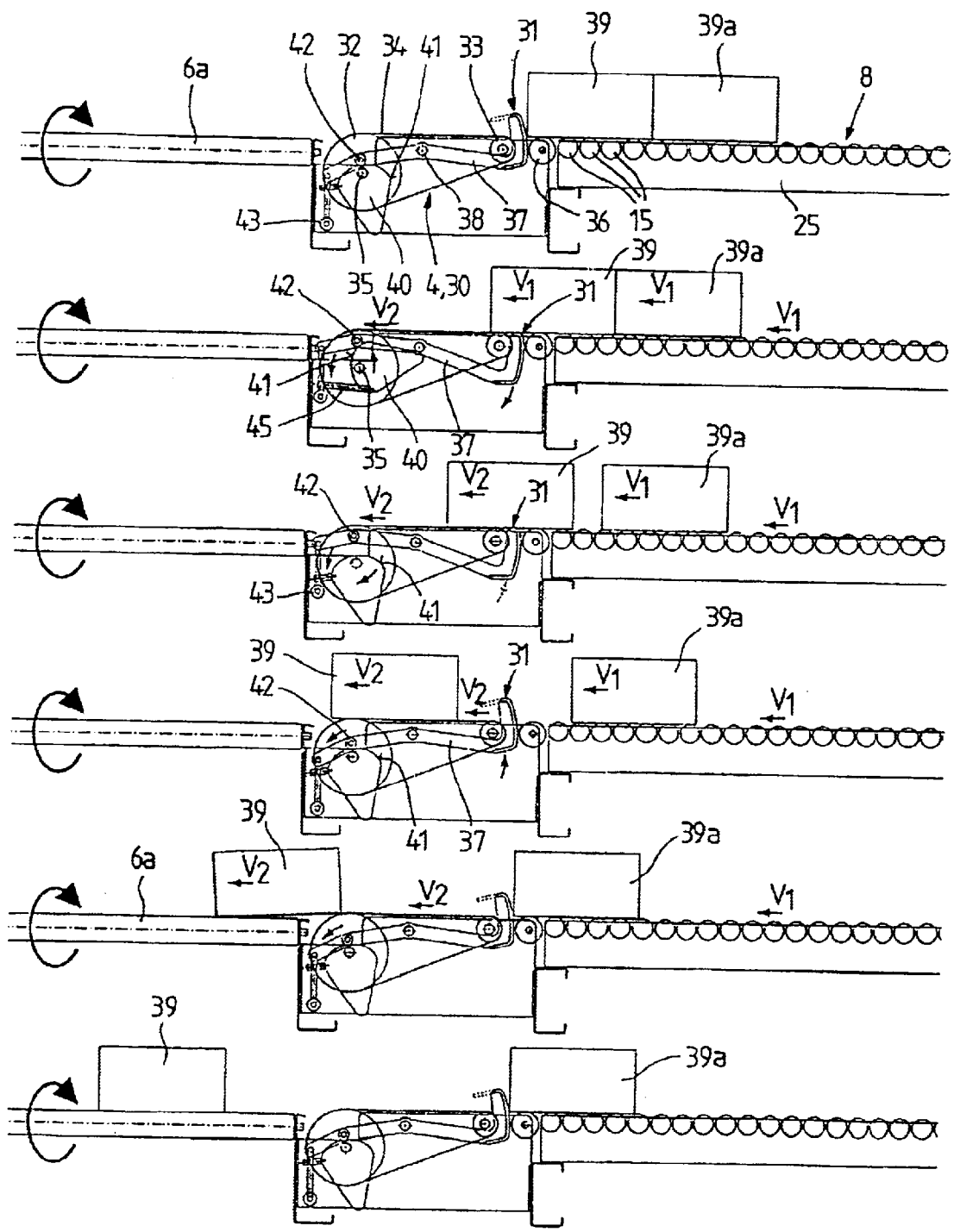
FIG. 5 in six process stages details of removal of the goods at the commissioning side of the commissioning storage device.

When the cam 40, as is illustrated in the change from the first stage in FIG. 5 to the second stage, is pivoted by approximately 90°, this results as a function of the cooperation of the cam surface 41 with the roll 42 in a pivoting of the lever 37 so that the retaining element 31 is lowered beneath the conveying plane of the roller path. The first piece of goods 39 is no longer retained at this point in time by the retaining element 31 and rolls therefore, driven by the roller path as well as optionally additionally by the force of gravity onto the horizontal conveyor 30. As soon as the bottom side of the first piece of goods 39 is in contact with the belt 34 of the horizontal conveyor 30, the piece of goods 39 follows the speed of the horizontal conveyor 30. This speed, as a function of the weight of the goods, is adjusted to be at least 25% higher than the conveying speed of the roller path 8. As a result of this increased speed on the horizontal conveyor 30, the first piece of goods 39 is separated from the following goods 39a. In FIG. 5, this is illustrated with the different speeds $V_2$ and $V_1$ wherein $V_2$ is greater than $V_1$.

In the third process stage according to FIG. 5, the piece of goods 39 rolls across the retaining element 31 while being conveyed almost exclusively by the horizontal conveyor 30 at its speed. At this point in time the cam 40 has been lowered again as a result of a temporal control. However, the retaining element 31 remains in its lowered position because its restoring force is smaller than the weight of the piece of goods 39. The aforementioned restoring force is generated by a counter weight 43 which is suspended from the second arm of the lever 37. Only when, as illustrated in the fourth process stage of FIG. 5, the bottom side of the piece of goods 39 has passed the retaining element 31, the lever 37 of the retaining element can be pivoted upwardly again under the effect of the counterweight 43. From this moment on, the path is again blocked so that the following piece of goods 39a is stopped at to the retaining element 31. Now the next removal step can be started wherein the process is repeated. The piece of goods 39 transported by the horizontal conveyor 30 moves onto the transport rolls 6a of the continuously driven transport path 5.

The drive of the cam 40 is derived from the continuous rotational movement of the drive shaft 35. For this purpose, a magnetic coupling 44 is seated on the drive shaft 35 whose driven part is the cam 40. Only for a temporally limited excitation of the magnetic coupling 44 an actuation of the cam 40 thus takes place and thereby the release of the retaining element 31. The drive force which is to be applied for this purpose is relatively minimal so that for driving the cam 40 already a small magnetic coupling on the drive shaft 35 is sufficient. A restoring spring 45 pulls the cam 40 back into its rest position.

With the aid of FIG. 6 details and the function of the transverse conveyor 11 in the supply area 2 of the commissioning storage device will be explained in the following. Each storage aisle has its own transverse conveyor 11 correlated therewith arranged at its front end. The transverse conveyor 11 operates, as has been explained already supra for the commissioning area, by employing endless belts 46 which are guided about pulleys 47,48. In order to prevent slip, the belts 46 and the pulleys 47, 48 are provided with intermeshing toothings. Also usable is a chain instead of the belt 46 as well as pinions instead of the pulleys 47, 48.

The upper run 49 of the belt 46 is located somewhat lower than the surface of the transport rollers 6a. The belt 46 and pulleys 47, 48 are relatively narrow so that they can be positioned between two adjacent transport rollers 6a of the transport path 6. On the outer side of each endless belt 46 follower elements 50 are arranged which can circulate together with the belt 46. The follower elements 50 project, when they are located on the upper run of the drive belt 46, past the conveying surface 51 of the transport path 6.

Figure 6:
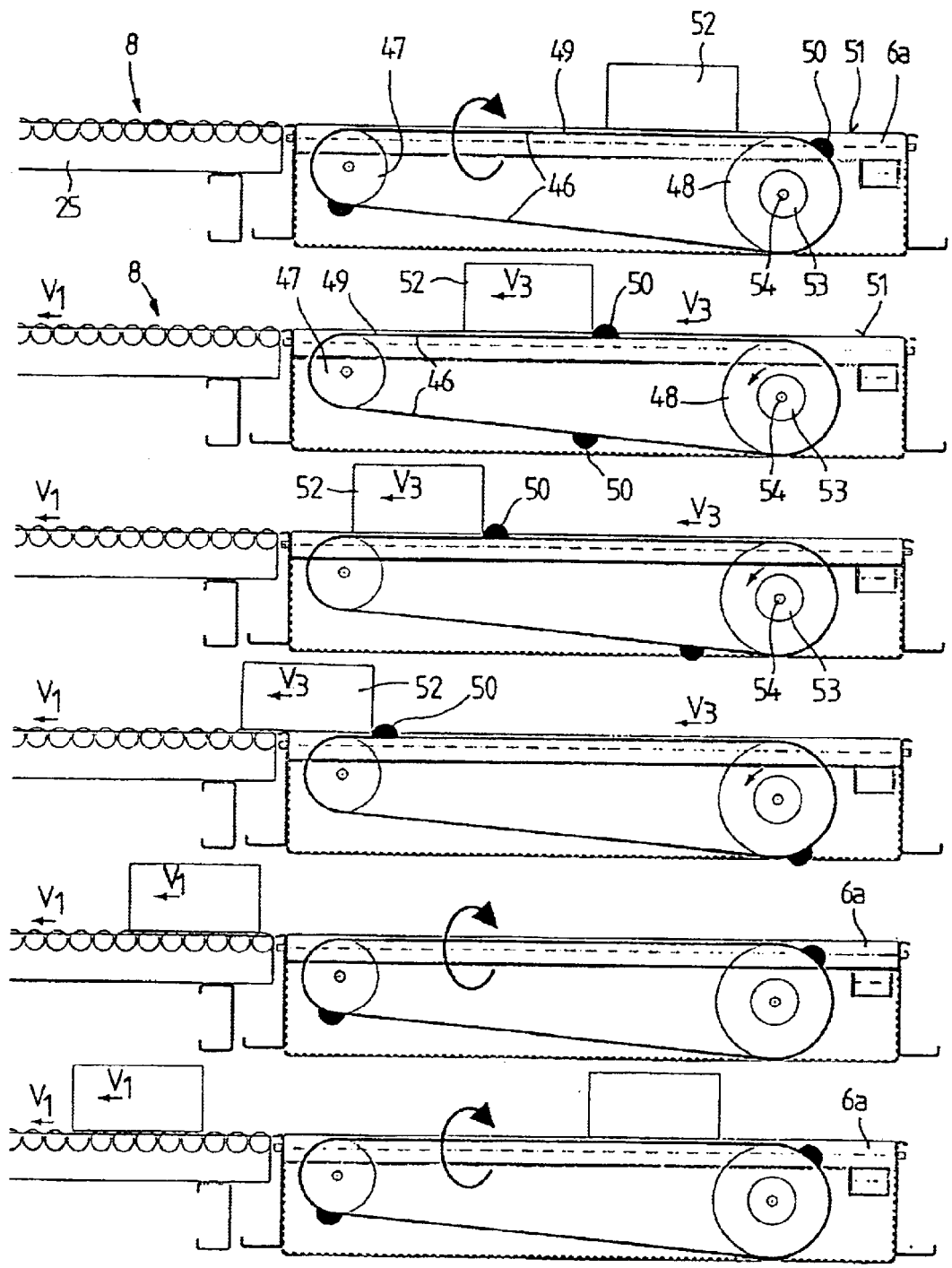
FIG. 6 in six process stages details of loading of the storage aisle in the supply area of the commissioning storage device.

The uppermost illustration in FIG. 6 illustrates that the spacing of the follower elements 50 is slightly greater than the length of the upper run 49. In this way, in the process stage, as illustrated in FIG. 6 at the uppermost position, none of the two follower elements 50 project past the conveying surface 51 and thus into the conveying path of the transport path. Only upon switching on the transverse conveyor 11 the outer one of the two follower elements 50 will emerge and engage the goods 52 so that it can be moved along the respective transport rollers 6a into the storage aisle 7. In the embodiment a total of two follower elements 50 are provided; however, their number can be greater or smaller, which depends in the end on the width of the transport path 6.

The drive of the transport belts 46 of the transverse conveyor 11 is realized also by means of a magnetic coupling 53. The magnetic couplings 53 are seated on a main drive shaft 54 common to all transverse conveyors 11 and can be separately controlled for each storage aisle. When supplying electric current, the magnetic couplings 53 provides a moment connection of the pulley 48 with the main drive shaft 5 so that the respective drive belt 46 is operated as long as the magnetic coupling 53 is supplied with electric current.

Figure 2:
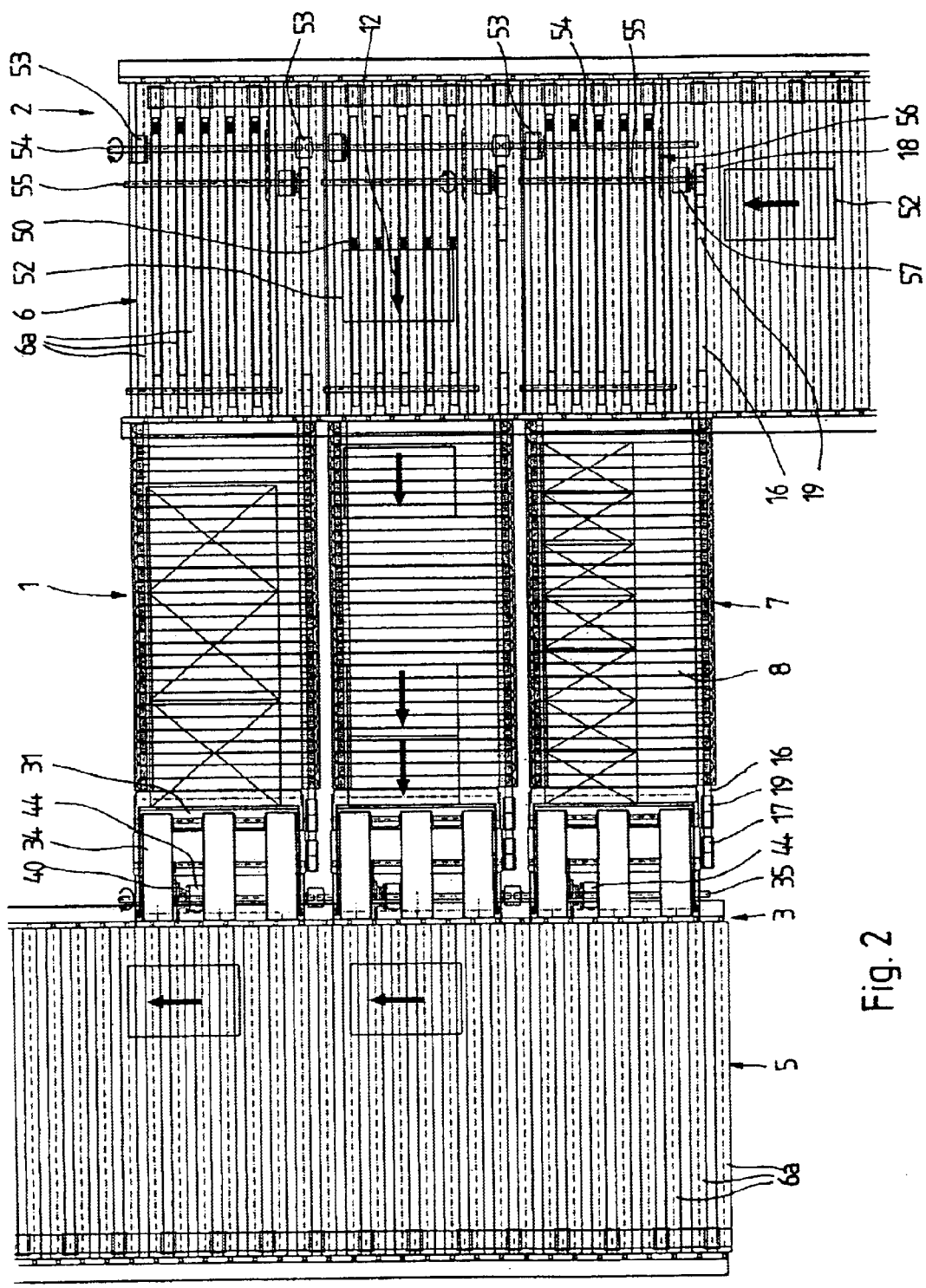
FIG. 2 a plan view onto a part of the commissioning storage device in an enlarged illustration, wherein for reasons of simplification the storage area is illustrated greatly shortened.

In particular FIG. 2 shows that from the main drive shaft 54 not only the movement of all transverse conveyors 11 is derived but also the drive action of the roller path 8. For this purpose, a further shaft 55 extends parallel to the main drive shaft 54 wherein the drive of the further shaft 55 is derived by means of the reversing gear 56 from the main drive shaft 54. The reversing gear 56 is comprised of two oppositely rotating gears which are seated in a torque-resistant way on the main drive shaft 54 and the shaft 55. By means of a further magnetic coupling 57 the deflection roll 18 is connected to the shaft 55 and forms the drive roller for the drive belt 16. Thus, while the shaft 55, driven by the main drive shaft 54, rotates constantly, a torque transmission onto the deflection roller 18 is realized only upon actuation of the magnetic coupling 57. In this way, it is possible, controlled by the magnetic coupling 57, to drive the respective roller path 8 only when needed. This is the case when in the supply area 2 new goods are to be stored within the storage aisles or in the commissioning area a piece of goods is to be removed from the storage aisle. Otherwise, the roller path of this storage aisle can rest when the magnetic coupling 57 is not actuated so that the goods present thereat are not loaded unnecessarily by friction.

Finally, FIG. 2 also shows that each transverse conveyor 11 is comprised of several transport belts 46, in the embodiment four such transport belts, respectively. This provides an improved and smoother transverse transport of the goods 52 into the respective storage aisles. During this transverse transport the transport rollers 6a of the transport path 6 are at rest.

Figure 7:
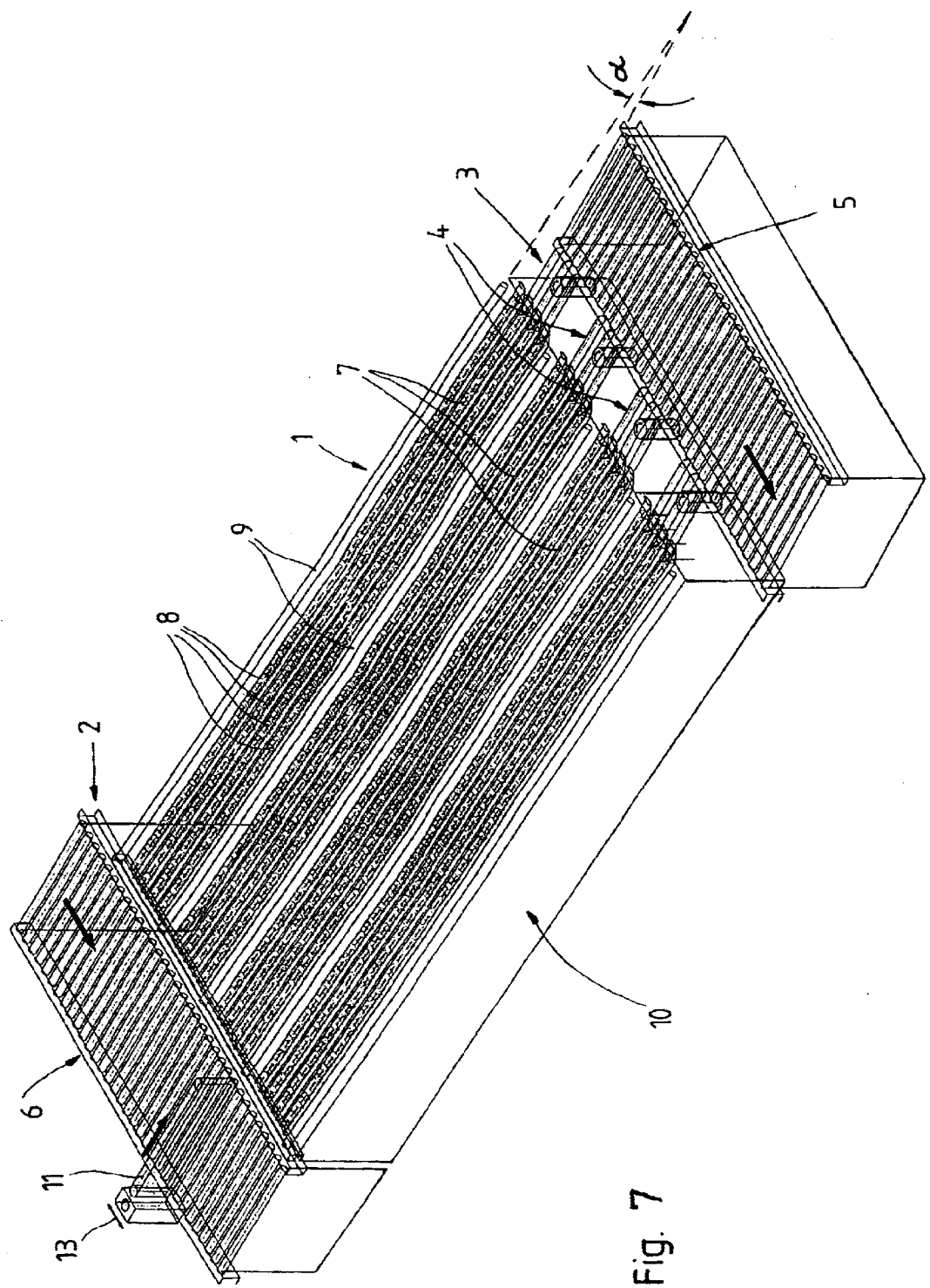
FIG. 7 in a perspective illustration a part of a commissioning storage device comprising a supply area, a storage area, and a commissioning area.

In FIG. 7, an overview illustration of a second embodiment of a commissioning storage device is illustrated. In deviation from the embodiment according to FIGS. 1 through 6, a common transverse conveyor 11 is provided for a plurality of storage aisles 7 in the supply area 2 and can be adjusted along the transport path 6 in a position in front of each storage aisle 7.

Figure 8:
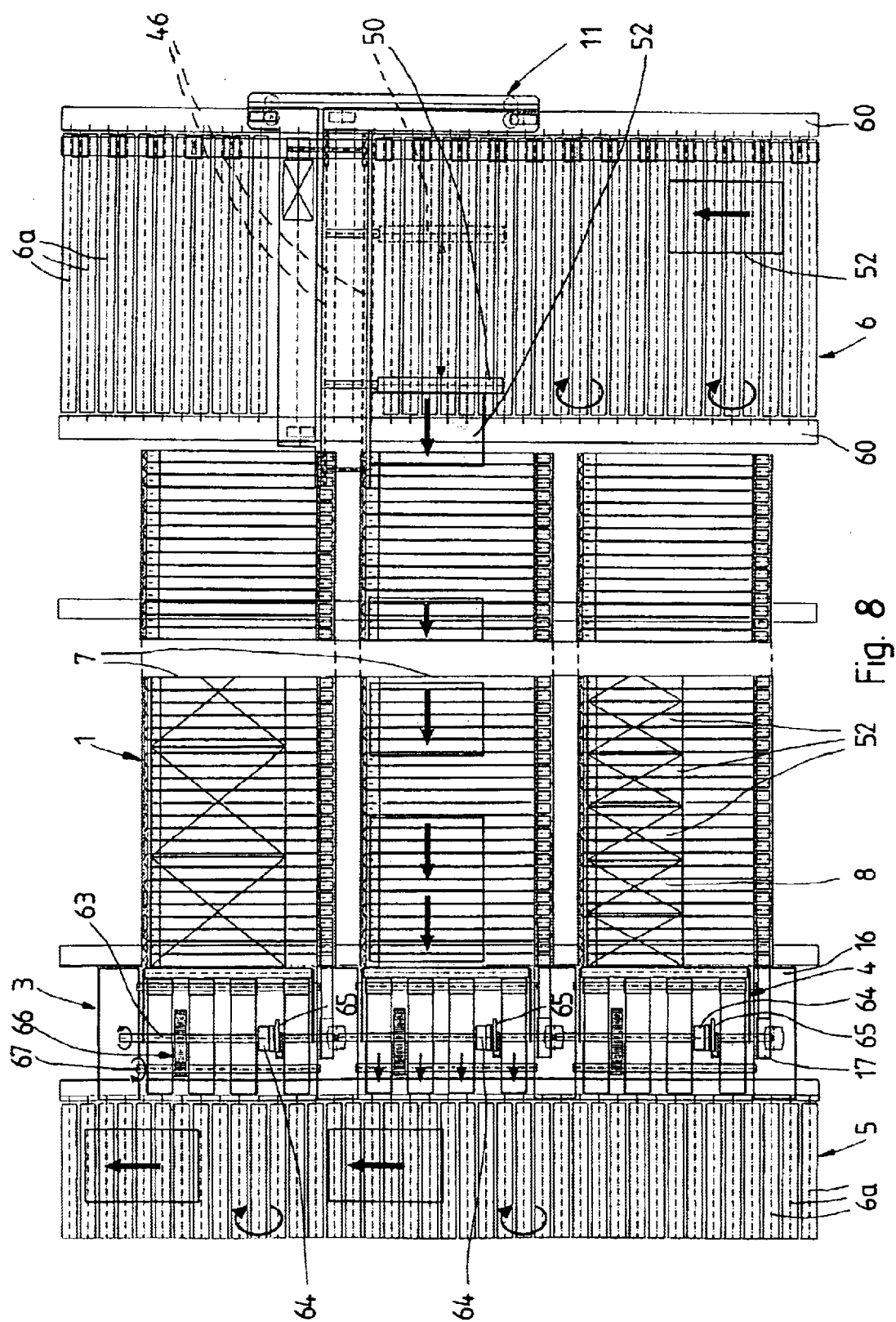
FIG. 8 a plan view onto a part of the commissioning storage device in an enlarged in illustration, where for reasons of simplification the storage area is greatly shortened.

The plan view of FIG. 8 shows that rails 60 extend along both longitudinal sides of the transport path 6 on which the transverse conveyor 11 is moveably arranged for which purpose the transverse conveyor has a suitable drive.

As illustrated in FIG. 15, the transverse conveyor is again comprised of an endless driven belt 46 or a corresponding endless chain. The belt 46 or chain is guided about pulleys 47, 48 so that an upper run 61 and a lower run 62 will result. Fastened on the belt or the chain two follower elements 50 are provided which, as soon as they are at the level of the lower run 62 of the drive belt 46, project directly past the conveying surface 51 of the transport path 6. When the transverse conveyor 11 is switched on, this leads to a drive action of the belt 46 or the chain, wherein the next follower elements 50, as soon as it has reached the lower run 62 will engage the goods 52 positioned thereon so that they are pushed along the respective transport rollers 6 into the storage aisle 7. In the embodiment a total of two follower elements 50 are provided; however, their number can be greater or smaller, which depends in the end on the width of the transport path 6. When only two follower elements 50 are used, they are positioned in those positions during standstill as illustrated in FIG. 15, i.e., the follower 50 which will entrain the next piece of goods 52 is positioned already on the lower run 62 and thus at the level of the goods, essentially in a ready position.

FIG. 8 also illustrates that the followers 50 are elongate horizontal rolls with axes of rotation transverse to the movement direction.

In the commissioning storage device according to FIGS. 7 to 15, the drive action of the roller paths 8 is realized by means of a main drive shaft 63 which is positioned in the commissioning area 3. This main drive shaft 63 is a uniform component for a module 10 of the commissioning storage device. According to FIG. 7, the module 10 is comprised of a total of four storage aisles. However, a module can also be combined of six or eight storage aisles which then are provided with their own drive source for the main drive shaft 63. This drive source is switched on as soon as goods are to be transported within one of the storage aisles of the corresponding module 10, be it conveying along one of the roller paths 8 or a removal conveying by means of one of the removal devices 4 of the module.

The main drive shaft 63 is provided for each storage aisle 7 with a deflection roller 17 which is connected fixedly for common rotation with the main drive shaft 63. The drive belt 16 for the rollers or rolls of the roller path 8 is guided by the deflection roller 17. Moreover, on the main drive shaft 63 for each storage aisle its own coupling 64 is provided which also surrounds with an annular shape, as already described in regard to the magnetic couplings, the main drive shaft 63. The couplings 64 can be controlled electrically and drive, upon supply of current, a cam 65, 40 whose details will be explained in the following.

By means of the spur wheel gear 66 with great step-up ratio of spur wheels 66a, 66b, the main drive shaft 63 is connected to a parallel shaft 67 separately provided for each storage aisle 67 which drives a horizontal conveyor 30 of the removal device.

As an alternative, it is also possible to employ the shaft 67 as a main drive shaft and to derive therefrom via the spur wheel gear 66 the movement of the shaft 63 with the couplings 64 seated thereon.

In the second embodiment described herein, the drive of the roller path as well as the drive of the removal device are derived directly or indirectly from the main drive shaft 63.

The drive of the roller path must not be the only transport mechanism for the goods to be transported along the roller path. According to FIG. 9, the roller path 8 can also be slanted at a descending slope at an angle α relative to the horizontal in which case the goods positioned on the roller path are transported additionally under the effect of the force of gravity along the roller path. The slant angle α is relatively small and is preferably only 4%.

Figure 9:
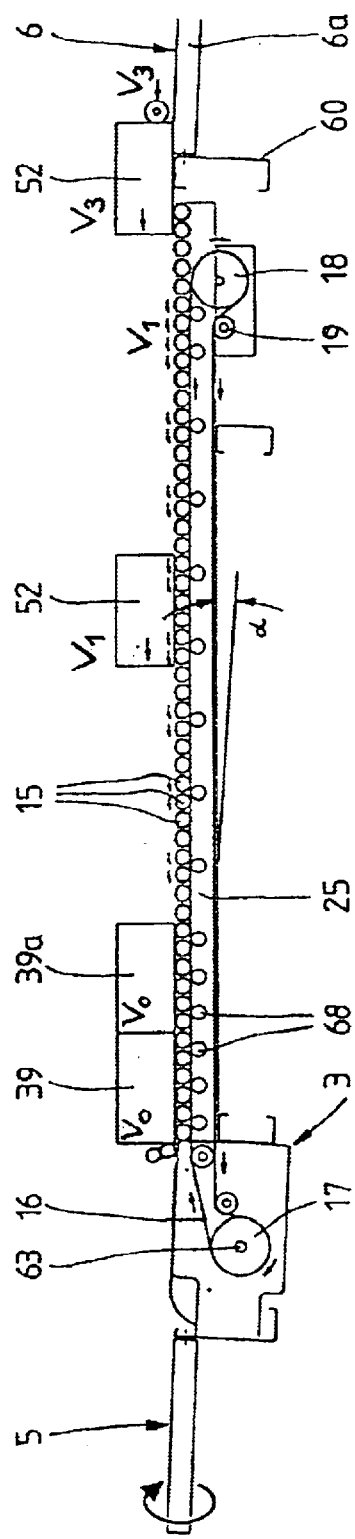
FIG. 9 a side view of a storage aisle of the commissioning storage device according to FIGS. 7 and 8.

According to FIG. 9 the drive of the individual rollers or rolls 15 of the roller path 8 is realized by an endless drive belt 16 guided about the deflection roller 17, on the one hand, and the deflection roller 18, on the other hand. Only the deflection roller 17 is driven since it is rotationally fixedly seated on the main drive shaft 63 while the deflection roller 18 is free-wheeling and is provided exclusively for the purpose of deflection. The roller 19 upstream of the roller 18 enables adjustment of the drive belt tension.

Figure 10:
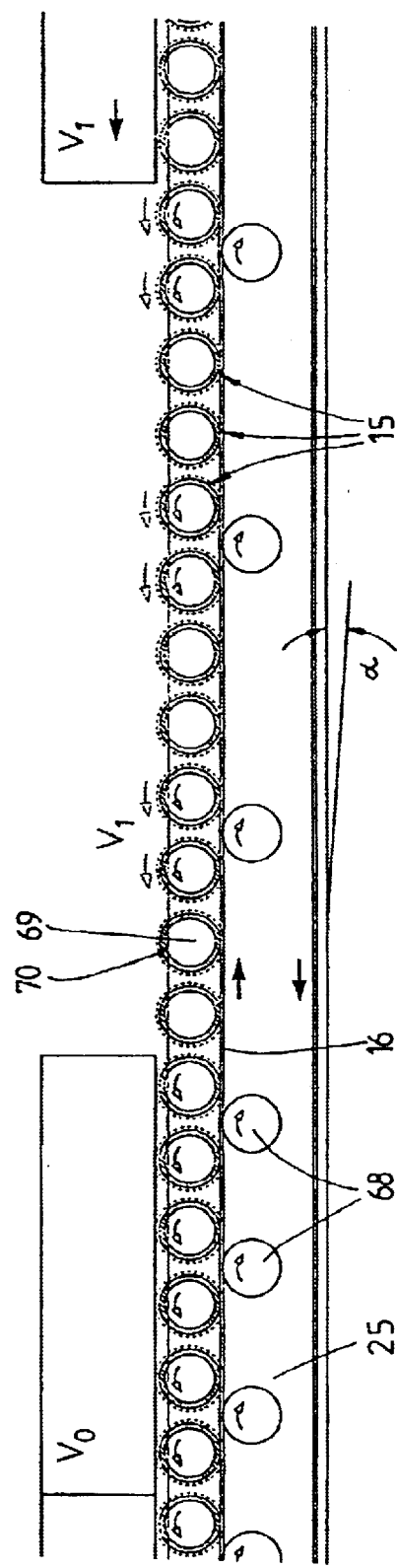
FIG. 10 the side view of the storage aisles according to FIGS. 4 and 9 as an enlarged detail illustration.

With the aid of FIGS. 10 to 12 in the following details of the drive of the rolls 15 are explained. The drive belt 16 is comprised of a flat, preferably rubber-coated, belt which is guided between the rolls 15 and counterpressure rolls 68. The counterpressure rollers 68 form in this case the abutment. One counterpressure roller 68 is provided for two up to four rolls 15.

In FIG. 12 it is illustrated that the rolls 15 on those ends where by means of the drive belt 16 the drive action is realized are provided with a monolithically formed cylindrical pin 69 which preferably has a smaller diameter than the roller body itself. On the pin 69 arranged coaxially to the roll body a force transmission element in the form of a bushing 70 is provided on whose outer mantle surface 71 the surface of the drive belt 16 rests with frictional connection.

The bushing 17 is provided at its inner end with a peripheral collar 70a which is provided as a stop for the drive belt 16. Pin 69 and bushing 70 are preferably cylindrically shaped. It is important that between the outer side of the pin 69 and the inner surface of the bushing 70 only minimal friction is present which can be achieved, for example, by a suitable material pairing. Suitable are particularly smooth running plastic materials for bushing 70 and pin 69. It is important that the friction value between pin 69 and bushing 70 is less than the friction value between the bushing 70 and the upper side of the drive belt 16. Moreover, the drive belt 16 is rubberized or can be provided with a toothing which meshes with a corresponding toothing at the exterior side of the bushing 70.

Since the drive belt 16 does not directly act on the rolls 15 but only indirectly by means of force transmitting elements, which in the illustrated embodiment are bushings 70, a smooth transmission of the drive force onto the roll 15 is realized. As soon as the roll 15 is braked, for example, as a result of the weight of the goods, this results in a relative movement between the pin 69 and bushing 70, i.e., the pin 69 fixedly connected with the roll rests while the bushing, driven by the drive belt 16 rotates further. As a result of this, the drive action of the rolls is realized by means of the slip which adjusts automatically always when the resistance of the rolls is too high. The latter is always the case when the goods on the roller path are backed up at the retaining element 31 of the respective removal device 4. This does therefore not result in an increased loading of the drive of the roller path or an increased impact pressure of the goods, but, instead, the drive forces and impact pressure forces remain very low as a result of the automatically adjusting slip of the rolls 15.

Moreover, a double effect results because of the use of the bushings 70: the rolls 15 are not only driven by a smooth force in order to be able in this way to even transport lightweight goods but moreover, in the case of a slanted roller path, a braking effect of the rollers 15 is also provided. This effect is obtained in connection with especially heavy goods. These, in the case of a slant of the roller path 8, have a tendency to reach too high speeds on the roller path as a result of their great weight. In this case, the slower driven rolls 15 act as braking members wherein the relative speed is again compensated by the slip produced between the rolls 15 and the bushings 70 operating with a metered friction. With the combination of the slight slanted roller path 8 and the bushings 70 operating under slip, excessively heavy goods are braked and excessively lightweight goods are transported actively. Overall, this provides a more uniform transporting action; lightweight as well as heavy goods as well as large and small goods are transported with substantially the same speed along the storage aisles.

Figure 13:
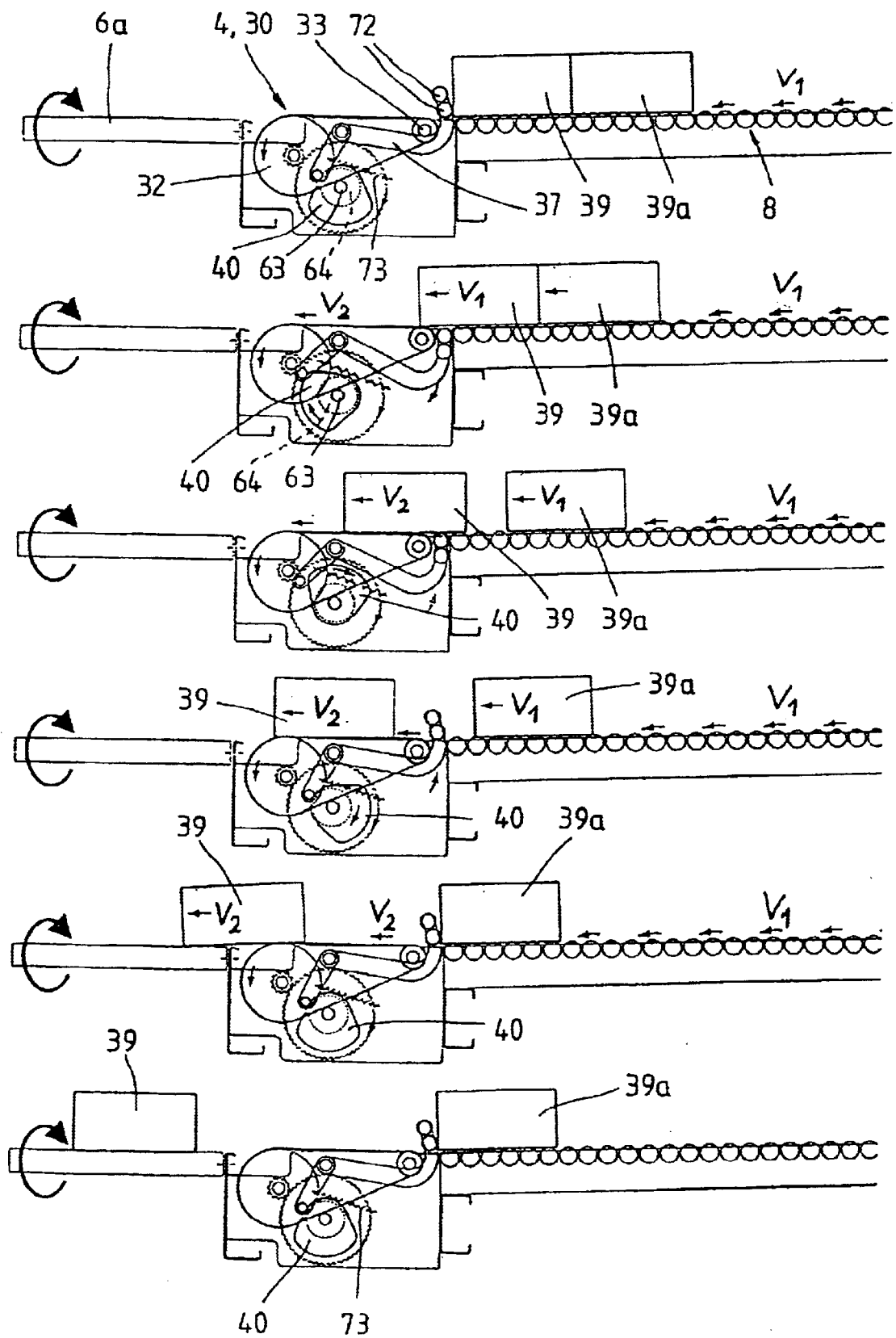
FIG. 13 in six process stages details of the removal of the goods at the commissioning side of the commissioning storage device.
Figures 14A, 14B:
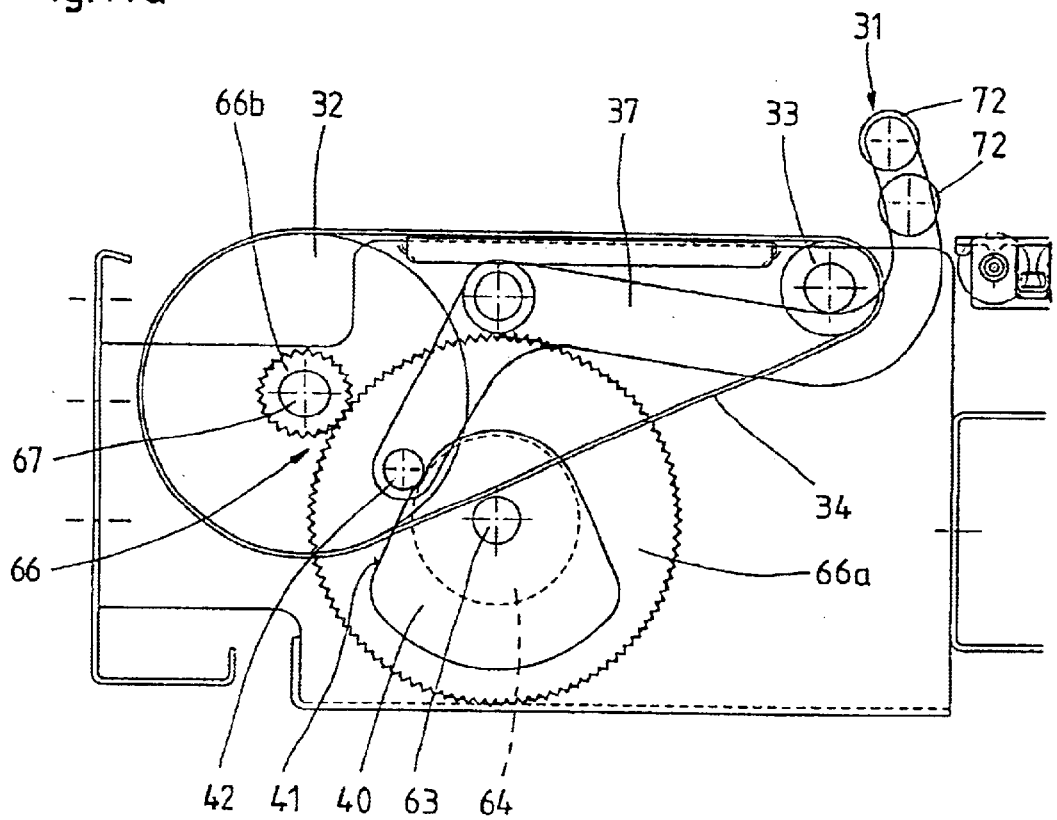
FIG. 14a a detail enlargement of the first partial detail figure of FIG. 13.
FIG. 14b a detail enlargement of the second partial detail figure of FIG. 13.

The configuration illustrated in FIGS. 13, 14a, and 14b as well as the function of the removal device 4 correspond substantially to the function as well as operation of the embodiment of FIG. 5. Different is the configuration of the retaining element 31. It is comprised of two stacked, freely rotating rolls 72. The advantage of these rolls instead of a simple sheet metal resides in the reduced frictional resistance upon pulling down the lever 37. Moreover, as illustrated in the third illustration of FIG. 13, the just released piece of goods 39 run with reduced resistance across the roller 72 as compared to a run across a rigid sheet metal, as in the embodiment of FIG. 5. For transferring the retaining elements 31 from a locking position illustrated in FIG. 14a into the final locking position illustrated in FIG. 14b, the cam 40 is provided. It has a cam surface 41 which moves along the roller 42 of the two-armed lever 37.

When the cam is pivoted according to FIGS. 14a and 14b about approximately 75°, this, as a result of the interaction of the cam surface 41 with the roller 42 of the two-arm lever 37, causes pivoting of the lever 37 so that the retaining element 31 or its roller 72 acting as a locking member is lowered below the conveying plane of the roller path. The first goods 39 roll, driven by the roller path and optionally additionally by the force of gravity, on the horizontal conveyor 30. As soon as the underside of the first piece of goods 39 is in contact with the belt 34 of the horizontal conveyor 30, the piece of goods 39 follows at the speed of the horizontal conveyor 30 which, depending on the weight of the piece of goods, is at least 25% higher than the conveying speed of the roller path 8.

After the cam 40 has again released the lever 37, the retaining element 31 remains in the lower position because its restoring force is smaller than the weight of the piece of goods 39. The restoring force is generated by a tension spring 73 which is suspended from the second arm of the lever 37.

When removing a piece of goods by means of the removing device, the cam 40 carries out a complete revolution, i.e., a rotation by 360°. Its drive is derived from the continuous rotational movement of the main drive shaft 63. This is provided by the already mentioned electrically controlled coupling 64. The coupling 64 can be a frictional coupling, a claw coupling or a magnetically operating coupling.

On the shaft 67 extending parallel to the main drive shaft 63 a driven pulley 32 of the horizontal conveyor is arranged. About this pulley as well as the other pulley 33, the wide belt 64 is guided whose outer side is at the same time the conveying surface of the removal device. FIG. 8 shows that for each removal device a total of four such belts 34 are used in order to form a uniform support for the piece of goods to be removed. The non-positive connection between the main drive shaft 63 and the shaft 67 is realized, as described already, via the spur wheel gear 66 of a high step-up ratio with the gears 66a on the main drive shaft 63 and 66b on the shaft 67.

It is understood that the afore described commissioning storage device described in detail is program-control. Despite its complexity, the control expenditure is relatively minimal because the major number of the processes is controlled by switching on and off the couplings which operate almost maintenance-free.

List of Reference Numerals

| | |
|---|---|
| 1 | storage area |
| 2 | supply area |
| 3 | commissioning area, removal area |
| 4 | removal device |
| 5 | transport path |
| 6 | transport path |
| 6a | transport roller |
| 7 | storage aisle |
| 8 | roller path |
| 9 | border, wheel flange |
| 10 | module |
| 11 | transverse conveyor |
| 12 | conveying direction |
| 13 | moving direction transverse conveyor |
| 15 | roll |
| 16 | drive belt |
| 17 | deflection roller |
| 18 | deflection roller |
| 19 | tensioning roller |

-continued

List of Reference Numerals

| | |
|---|---|
| 25 | roller path profile |
| 30 | horizontal conveyor |
| 31 | retaining element |
| 32 | pulley |
| 33 | pulley |
| 34 | belt |
| 35 | drive shaft |
| 36 | roller |
| 37 | lever |
| 38 | axle |
| 39 | piece of goods to be removed |
| 39a | trailing piece of goods |
| 40 | cam |
| 41 | cam surface |
| 42 | roller |
| 43 | counterweight |
| 44 | magnetic coupling |
| 45 | tension spring |
| 46 | transport belt |
| 47 | pulley |
| 48 | pulley |
| 49 | upper run |
| 50 | follower element |
| 51 | conveying surface |
| 52 | goods |
| 53 | magnetic coupling |
| 54 | main drive shaft |
| 55 | shaft |
| 56 | reversing gear |
| 57 | magnetic clutch |
| 60 | rail |
| 61 | upper run |
| 62 | lower run |
| 63 | main drive shaft |
| 64 | coupling |
| 65 | cam |
| 66 | spur wheel gear |
| 66a | gear |
| 66b | gear |
| 67 | shaft |
| 68 | counterpressure roller |
| 69 | pin |
| 70 | force transmitting element, bushing |
| 70a | collar |
| 71 | mantle surface |
| 72 | roll |
| 73 | tension spring |
| α | slant angle |

What is claimed is:

1. A transport and storage device for packaged goods, comprising:

at least one roller path (8) for goods to be transported and stored, wherein the at least one roller path (8) has rollers;

force transmitting elements arranged rotatably on the rollers, wherein the force transmitting elements are bushings (70) having an inner surface, respectively;

a common drive (16) configured to rotate the rollers, wherein a first torque transmittable between the bushings and the corresponding rollers, respectively, is smaller than a second torque transmittable between the common drive (16) and the bushings;

wherein the rollers have a bearing section fixedly connected with the rollers, respectively; and wherein the inner surfaces of the bushings (70) are rotatably supported on the bearing section of the rollers (15).

2. The transport and storage device according to claim 1, wherein the bearing section is a pin (69) formed at one end of the roller (15) and having a diameter smaller than a diameter of the roller.

3. The transport and storage device according to claim 1, wherein the bushings (70) have an end facing the rollers, respectively, and wherein the end has a peripheral collar (70a).

4. The transport and storage device according to claim 1, wherein the common drive comprises an endless drive belt (16).

5. The transport and storage device according to claim 4, wherein the drive belt (16) is guided between the bushings (70) and abutments (68) cooperating with the bushings (70).

6. The transport and storage device according to claim 5, wherein the abutments are non-driven counterpressure rollers (68).

7. The transport and storage device according to claim 4, wherein the common drive comprises at least two deflection rollers (17, 18) configured to deflect the drive belt (16), wherein one of the at least two deflection rollers (17) is arranged under a removal area (3) of the transport and storage device and is driven.

8. The transport and storage device according to claim 1, comprising a main drive shaft (63) configured to drive the common drive and several removal devices (4) of a removal area of the transport and storage device.

9. The transport and storage device according to claim 1, wherein the at least one roller path (8) in a direction of transport has a descending slant having a slant angle of 2.5% to 6%.

10. The transport and storage device according to claim 9, wherein the slant angle is 3% to 5.5%.

11. The transport and storage device according to claim 1, comprising a storage area (1) with storage aisles (7) for goods to be stored, wherein the storage aisles (7) are formed by a plurality of the roller paths (8) extending parallel to one another.

12. The transport and storage device according to claim 11, wherein each one of the storage aisles (7) is provided with a removal device (4), wherein the removal device (4) comprises an actuatable retaining element (31) projecting into a conveying path of the roller path (8) and a horizontal conveyor (30) arranged in a transport direction of the roller path (8) behind the retaining element (31), wherein a conveying speed of the horizontal conveyor is greater than a conveying speed of the roller path (8).

13. The transport and storage device according to claim 12, wherein the conveying speed of the horizontal conveyor (30) is at least 25% greater than the conveying speed of the roller path (8).

14. The transport and storage device according to claim 12, wherein the horizontal conveyor (30) is comprised of a driven first pulley (32), at least one further entrained pulley (33), and an endless belt (34) guided about the pulleys (32, 33), wherein the driven pulley (32) defines a leading end and the entrained pulley (33) a rearward end of the horizontal conveyor (30).

* * * * *